US010035215B2

(12) United States Patent
Din et al.

(10) Patent No.: US 10,035,215 B2
(45) Date of Patent: Jul. 31, 2018

(54) WIRE FUSING APPARATUS

(71) Applicants: XYZprinting, Inc., New Taipei (TW); Kinpo Electronics, Inc, New Taipei (TW); Cal-Comp Electronics & Communications Company Limited, New Taipei (TW)

(72) Inventors: Shih-Jer Din, New Taipei (TW); Yang-Teh Lee, New Taipei (TW); Yi-Lin Chiu, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 938 days.

(21) Appl. No.: 14/339,471

(22) Filed: Jul. 24, 2014

(65) Prior Publication Data

US 2015/0053649 A1     Feb. 26, 2015

Related U.S. Application Data

(60) Provisional application No. 61/869,079, filed on Aug. 23, 2013.

(30) Foreign Application Priority Data

Oct. 29, 2013   (TW) .............................. 102139104 A

(51) Int. Cl.
*B23K 1/00*     (2006.01)
*B23K 20/00*    (2006.01)
(Continued)

(52) U.S. Cl.
CPC .......... *B23K 20/004* (2013.01); *B23K 20/023* (2013.01); *B23K 20/26* (2013.01)

(58) Field of Classification Search
CPC ............................ B23K 2201/32; B21D 37/16
(Continued)

(56) References Cited

U.S. PATENT DOCUMENTS 4,712,413 A * 12/1987 Koch ......................... B21J 1/06
                                                       164/900
6,868,709 B2 * 3/2005 Adams ..................... B21J 1/06
                                                       72/342.5
(Continued)

FOREIGN PATENT DOCUMENTS

CN        2282981       6/1998
CN      201872340       6/2011
(Continued)

OTHER PUBLICATIONS

"Office Action of China Counterpart Application," dated Mar. 4, 2016, p. 1-p. 7.

*Primary Examiner* — Thien S Tran
(74) *Attorney, Agent, or Firm* — JCIPRNET

(57) ABSTRACT

A wire fusing apparatus including a first body having a first surface, a second body having a second surface, and a heating unit is provided. The second body is pivoted to the first body to rotate relatively to the first body enabling the first and second bodies to be in an expanded or a closed state. When the first and second bodies are in the closed state, the first and second surfaces define a closed containing groove for containing two independent wires butt jointed with each other. The first surface, the second surface and the containing groove each has a heat-conducting region, and the heat-conducting regions contact each other when the first and second bodies are in the closed state. The heating unit disposed on the first or second body contacts one of the heat-conducting regions for heat-fusing a butt-jointing point of the wires to form a fused wire.

10 Claims, 4 Drawing Sheets

(51) Int. Cl.
  *B23K 20/02* (2006.01)
  *B23K 20/26* (2006.01)
(58) Field of Classification Search
  USPC ............ 219/56, 57; 140/112, 113; 72/342.7, 72/342.8, 342.92
  See application file for complete search history.

(56) References Cited

U.S. PATENT DOCUMENTS

| | | | |
|---|---|---|---|
| 7,225,512 | B2 | 6/2007 | Genova et al. |
| 2006/0180578 | A1* | 8/2006 | Byerly .................... B21C 47/20 219/56.22 |
| 2014/0008335 | A1* | 1/2014 | Yao ...................... B23K 1/0008 219/121.64 |

FOREIGN PATENT DOCUMENTS

| | | |
|---|---|---|
| CN | 201960793 | 9/2011 |
| DE | 10241592 | 3/2004 |
| TW | 183161 | 5/1992 |

\* cited by examiner

WIRE FUSING APPARATUS

CROSS-REFERENCE TO RELATED APPLICATION

This application claims the priority benefits of U.S. provisional application Ser. No. 61/869,079, filed on Aug. 23, 2013 and Taiwan application serial no. 102139104, filed on Oct. 29, 2013. The entirety of each of the above-mentioned patent applications is hereby incorporated by reference herein and made a part of this specification.

BACKGROUND OF THE INVENTION

Field of the Invention

The invention relates to a fusing apparatus, and more particularly, to a wire fusing apparatus.

Description of Related Art

Along with advances in computer-aided manufacturing (CAM), the manufacturing industry has developed rapid prototyping (RP) technologies, thereby rapidly fabricating products from an original design concept. Three-dimensional printing is a kind of RP technology and is a technique of constructing a three-dimensional object by stacking construction materials in a fused state one by one based on a digital three-dimensional model. The method is so-called a fused deposition modeling (FDM) method. In the past, the method was often used in fields such as mold manufacturing and industrial design for manufacturing models. Nowadays, it is gradually applied to direct manufacture of some products. In high-value applications (e.g. hip joints or teeth, or some airplane parts) in particular, there have been parts made by printing using such technology, which implies popularization of the "three-dimensional printing" technique.

In a common situation where a current three-dimensional printer is employed, a solid state wire composed of construction materials is heated to render the construction materials in a fused state. The construction materials are then extruded from a print head of the three-dimensional printer. Accordingly, the fused construction materials are stacked layer by layer from bottom to top on a base of the three-dimensional printer, so as to form a three-dimensional object. However, in the three-dimensional printing process, when the wire of construction material is completely consumed, the printing task will be suspended or terminated and replacement with a new wire of construction material will be required for the printing task to resume or start over. Therefore, current three-dimensional printing equipments are still very inconvenient in use.

SUMMARY OF THE INVENTION

The invention provides a wire fusing apparatus capable of fusing a wire with another wire to form a fused wire.

The wire fusing apparatus of the invention includes a first body and a second body. The first body has a first surface. The second body is pivoted to one side of the first body to rotate relatively to the first body which enables the second body to be in an away state or a closed state with the first body. The second body has a second surface. Accordingly, when the first body and the second body are in the closed state, the second surface and the first surface are closed and jointly define a containing groove for containing two independent wires butt-jointed with each other. The first surface, the second surface and the containing groove each has a heat-conducting region, and the heat-conducting regions contact each other when the first and second bodies are in the closed state. The heating unit is disposed on the first body or the second body, and contacts one of the heat-conducting regions to heat a butt-jointing point of the two wires, so as to form a fused wire by fusing the two wires.

Based on the above, the wire fusing apparatus of the invention includes the first body and the second body pivoted to each other at one side, so that the second body is adapted to rotate relatively to the first body to be in the away state and the closed state with the first body. The first body and the second body each includes a heat-conducting region adapted to be heated by the heating unit. In this way, the two wires to be fused are butt-jointed with each other and disposed in the containing groove of the first body. The second body is rotated relatively to the first body to form the closed state. Then, the butt-jointing point of the two wires is heated, so that the two wires are fused to form a fused wire. With such disposition, the wire fusing apparatus of the invention is applicable to any suitable occasion for performing a fusing process on any two wires needed to be fused.

To make the above features and advantages of the invention more comprehensible, embodiments accompanied with drawings are described in detail as follows.

DETAILED DESCRIPTION OF DISCLOSED EMBODIMENTS

Figure 1:
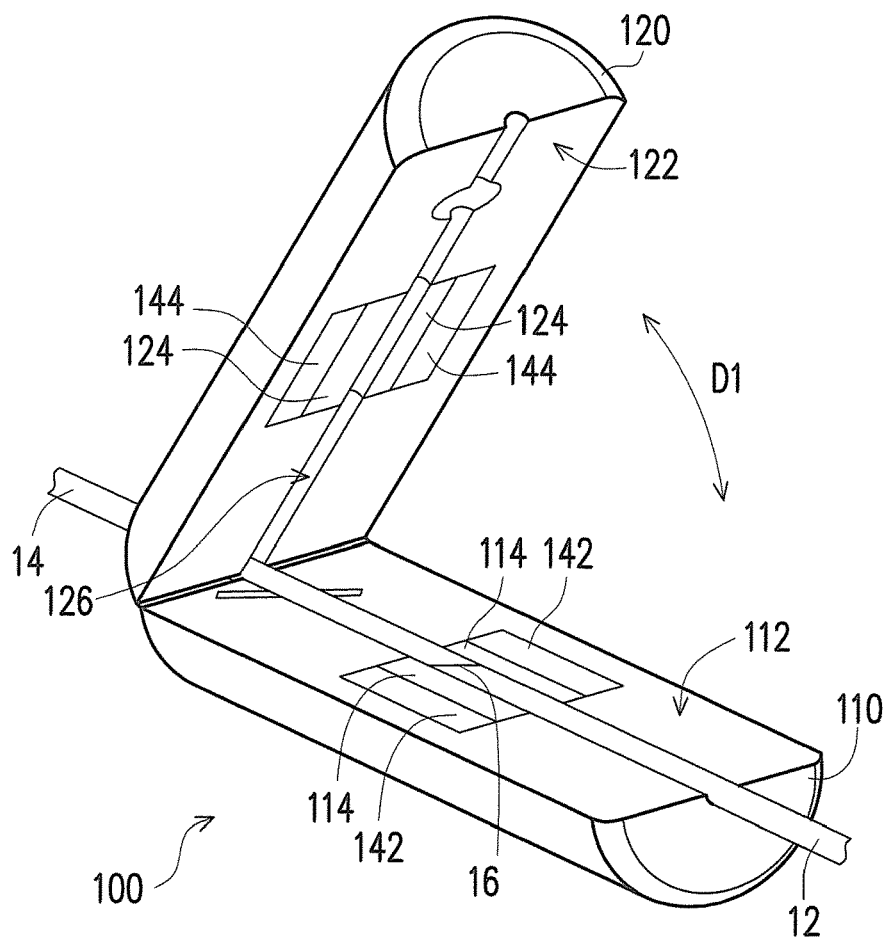
FIG. 1 is a schematic view of a wire fusing apparatus in an expanded state according to an embodiment of the invention.

It is to be understood that both the foregoing and other detailed descriptions, features, and advantages are intended to be described more comprehensively by providing embodiments accompanied with drawings hereinafter. In the following embodiments, wordings used to indicate directions, such as "up," "down," "front," "back," "left," and "right", merely refer to directions in the accompanying drawings. Therefore, the directional wording is used to illustrate rather than limit the invention. Moreover, in the following embodiments, identical reference numerals indicate identical or similar elements.

Figure 2:
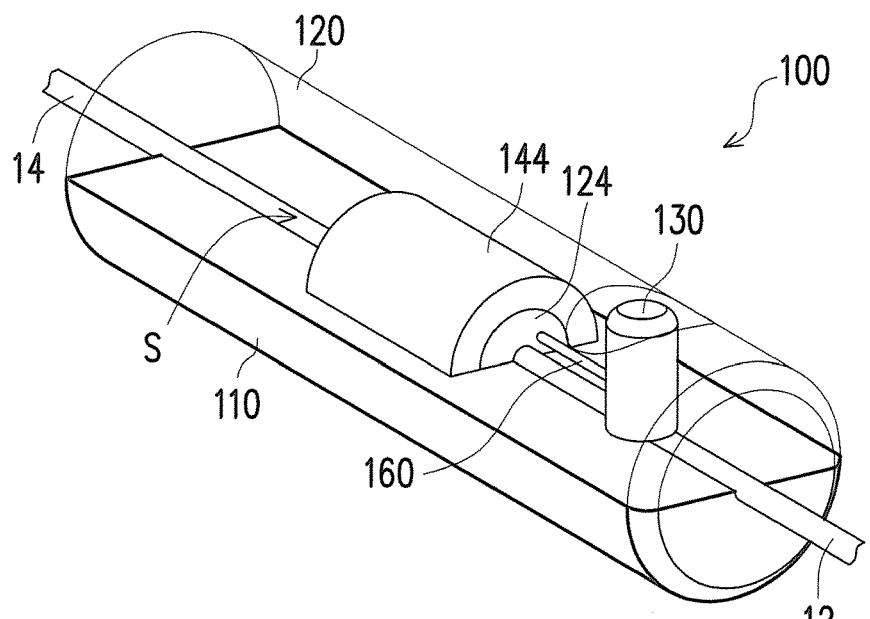
FIG. 2 is a schematic view of the wire fusing apparatus in FIG. 1 in a closed state.

FIG. 1 is a schematic view of a wire fusing apparatus in an expanded state according to an embodiment of the invention. FIG. 2 is a schematic view of the wire fusing apparatus in FIG. 1 in a closed state. It is to be noted that in order to clarify the internal structure of a wire fusing apparatus 100, a second body 120 in FIG. 2 is illustrated in a perspective manner. Referring to both FIG. 1 and FIG. 2, in the present embodiment, the wire fusing apparatus 100 includes a first body 110, the second body 120 and a heating unit 160. The first body 110 has a first surface 112 and a first heat-conducting region 114. The first body 110 exposes a heat-conducting surface of the first heat-conducting region 114 as shown in FIG. 1. The second body 120 is pivoted to one side of the first body 110 to rotate relatively to the first body 110 along a rotation direction D1, so that the second body 120 and the first body 110 form an away state as shown in FIG. 1, or a closed state as shown in FIG. 2. The second body 120 has a second surface 122 and a second heat-conducting region 124 as shown in FIG. 1. The second heat-conducting region 124 is disposed correspondingly to the first heat-conducting region 114, and the second body 120 exposes a heat-conducting surface of the second heat-conducting region 124. That is to say, the first surface 112 and the second surface 122 have the heat-conducting regions 114 and 124 respectively, so that when the second body 120 and the first body 110 are in the closed state as shown in FIG. 2, the heat-conducting regions 114 and 124 contact each other. Moreover, the first surface 112 and the second surface 122 each has a groove as shown in FIG. 1. The grooves pass through the heat-conducting regions 114 and 124 respectively, so as to jointly define a closed containing groove 126 when the first body 110 and the second body 120 are in the closed state as shown in FIG. 2. The containing groove 126 is configured to contain two independent wires 12 and 14 butt-jointed with each other, and to pass through the heat-conducting regions 114 and 124. In the present embodiment, the heating unit 160 is disposed on the first body 110 or the second body 120, and contacts one of the heat-conducting regions 114 and 124. In the present embodiment, the heating unit 160 may be any heating element capable of converting electrical energy into heat energy in order to perform a heating process on one of the heat-conducting regions 114 and 124, and the heat energy is transmitted to the other one of the heat-conducting regions 114 and 124 by the contact of the heat-conducting regions 114 and 124.

Figure 3:
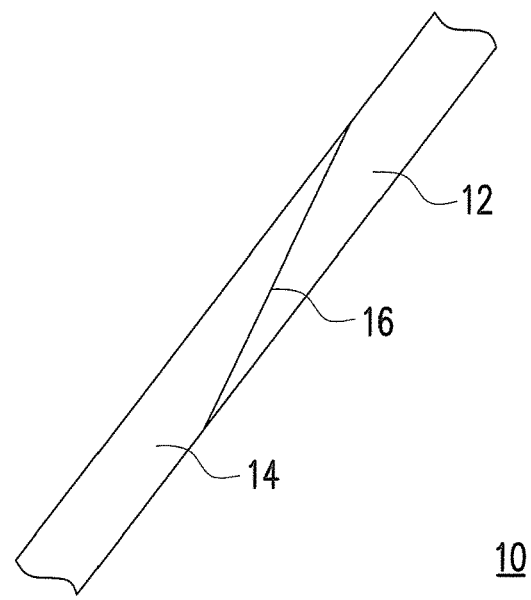
FIG. 3 is a schematic view of a fused wire formed by fusing two wires in FIG. 1.

FIG. 3 is a schematic view of a fused wire formed by fusing two wires in FIG. 1. Referring to FIG. 1 to FIG. 3 together, in the present embodiment, the containing groove 126 crosses over the second surface 122 along a long axis of the second body 120 and passes through the second heat-conducting region 124, so as to define a closed containing space S when the first body 110 and the second body 120 are in the closed state as shown in FIG. 2. The containing space S is adapted to contain the two independent wires 12 and 14 butt-jointed with each other as shown in FIG. 1. It is to be noted that the wires 12 and 14 in FIG. 1 are two independent and separate wires having their ends merely touching each other without adhesion force exists therebetween. In this way, after the two independent and separate wires 12 and 14 are disposed in a butt joint manner in the containing groove 126, the second body 120 is rotated toward the first body 110, so that the first body 110 and the second body 120 are in the closed state as shown in FIG. 2, and the wires 12 and 14 are located in the closed containing space S. At this moment, the heating unit 160 performs a heating process on a butt-jointing point 16 of the wires 12 and 14 through the first heat-conducting region 114 and the second heat-conducting region 124, so as to fuse the wires 12 and 14 to form a fused wire 10 as shown in FIG. 3.

In the present embodiment, the wires 12 and 14 are material supply wires of a three-dimensional (3-D) printer. Generally speaking, a material supply wire of a 3-D printer is a solid state wire composed of construction materials. Moreover, the material supply wire is heated by, for example, a heating unit, so as to cause the construction materials to be in a fused state and to be extruded from a print head of the 3-D printer. Then, the construction materials are stacked on a base of the 3-D printer layer by layer to form a 3-D object. One of the wires 12 and 14 is, for example, a material supply wire used by the 3-D printer at present, and the other one of the wires 12 and 14 is a new material supply wire for replacement. In the wire fusing apparatus 100 of the present embodiment, the above mentioned two material supply wires have two of their ends butt-jointed together, and then are disposed in the containing groove 126. Then, the second body 120 is rotated toward the first body 110 to be in the closed state with the first body 110 as shown in FIG. 2. The butt-jointing point 16 of the two material supply wires is heated by means of the heating unit 160 and by thermal conduction of the first heat-conducting region 114 and the second heat-conducting region 124. Thereby, the material supply wire in use and the new material supply wire for replacement are fused to form a continuous material supply wire for the 3-D printer to use. Of course, it is understood by persons of ordinary skill in the art that the present embodiment is only an example for illustration, and the invention is not limited thereto. In other embodiments of the invention, the wires 12 and 14 may be any two wires needed to be fused, and are fused by the wire fusing apparatus 100 in the present embodiment to form a fused wire.

In the present embodiment, the wire fusing apparatus 100 further includes a heating control interface 130 as shown in FIG. 2. The heating control interface 130 is configured to be electrically connected to the heating unit 160, so as to control the heating unit 160 to switch on and off the heating process and to make a temperature adjustment on the first heat-conducting region 114 and the second heat-conducting region 124. For example, the heating control interface 130 is a press type switch. After the wires 12 and 14 are disposed in the butt joint manner in the containing groove 126, the second body 120 is rotated toward the first body 110 by a user, so that the first body 110 and the second body 120 are in the closed state. At this moment, the user presses the heating switch 130 to control the heating unit 160 to start the heating process on the first heat-conducting region 114 and the second heat-conducting region 124. As a result, the butt-jointing point 16 of the wires 12 and 14 is fused, and thus the wires 12 and 14 are fused to form the fused wire 10. Of course, it is understood by persons of ordinary skill in the art that the present embodiment is only an example for illustration, and the invention is not limited thereto. In other embodiments of the invention, the heating control interface 130 may be a push type switch or any other type of switch. As long as it is electrically connected to the heating unit 160 and is able to control the heating unit 160 to start and stop a heating process or to make a temperature adjustment on the heat-conducting regions 114 and 124, it is within the scope of the invention.

In addition, in the present embodiment, the wire fusing apparatus 100 further includes a first heat-insulating element 142 and a second heat-insulating element 144. As shown in FIG. 1, the first heat-insulating element 142 is disposed between the first surface 112 and the first heat-conducting region 114 located on the first surface 112, and exposes a heat-conducting surface of the first heat-conducting region 114 facing the second surface 122. As shown in FIG. 2, the second heat-insulating element 144 is disposed between the second surface 122 and the second heat-conducting region 124 located on the second surface 122, and, as shown in FIG. 1, exposes a heat-conducting surface of the second heat-conducting region 124 facing the first surface 112. That is to say, the heat-insulating elements 142 and 144 cover part of the heat-conducting regions 114 and 124 respectively, and are located between the heat-conducting regions 114 and 124 and the bodies 110 and 120, thereby reducing damage to the bodies 110 and 120 caused by heat arising from the heat-conducting regions 114 and 124.

Figure 4:
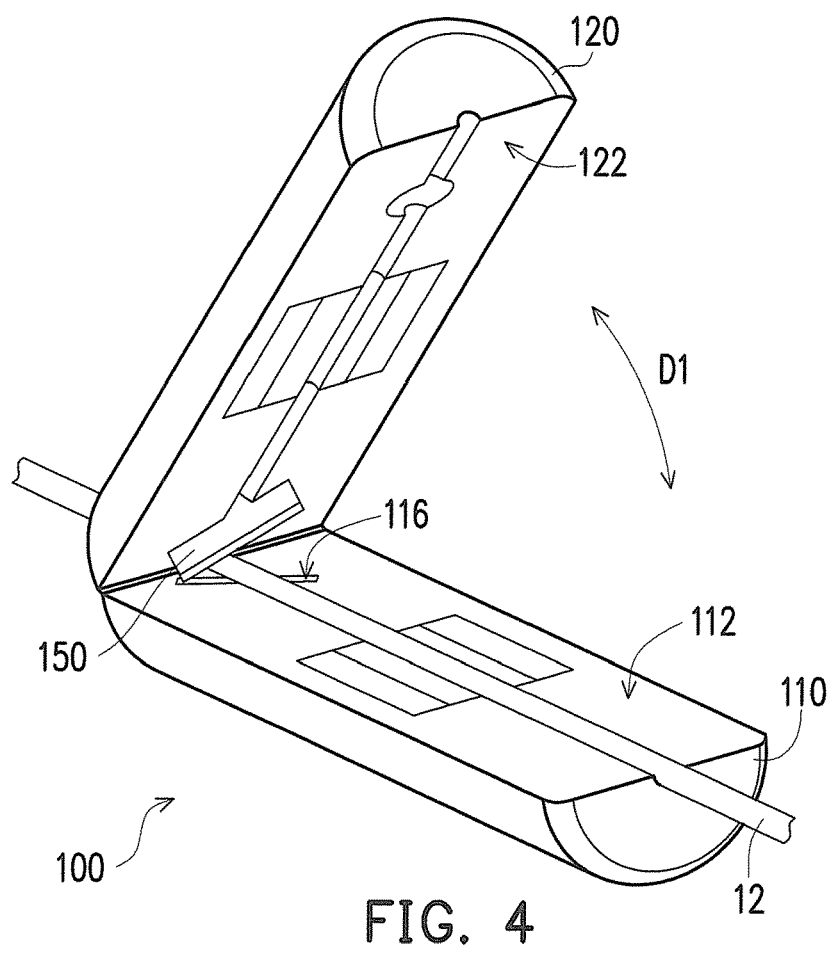
FIG. 4 is a schematic view of a wire fusing apparatus in the expanded state according to an embodiment of the invention.
Figure 5:
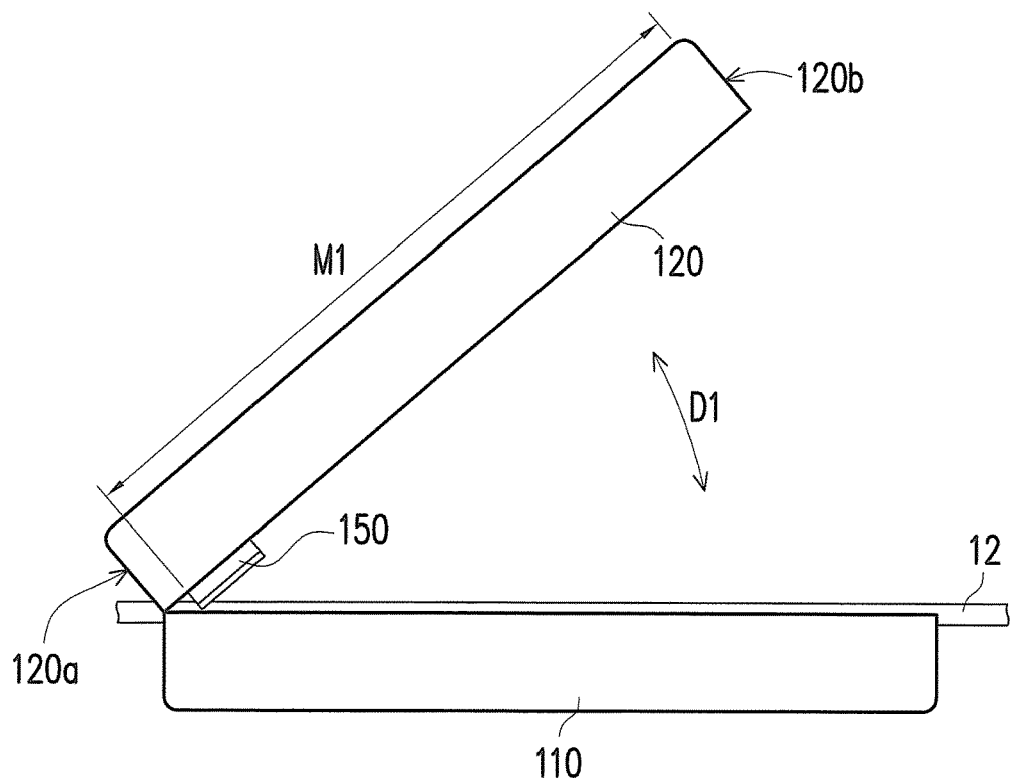
FIG. 5 is a schematic side view of the wire fusing apparatus in FIG. 4 in an expanded state.

FIG. 4 is a schematic view of a wire fusing apparatus in an away state according to an embodiment of the invention. FIG. 5 is a schematic side view of the wire fusing apparatus in FIG. 4 in the away state. Referring to FIG. 4, in the present embodiment, the wire fusing apparatus 100 further includes a cutting member 150 disposed on the second surface 122, as shown in FIG. 4. The wires 12 and 14 to be fused are adapted to be disposed on the first surface 112 individually before the heating process. With such disposition, the cutting member 150 cuts the wires 12 and 14 individually when the second body 120 rotates along the rotation direction D1 to the closed state, so as to form a cutting surface on each of the wires 12 and 14. After that, the cutting surfaces of the wires 12 and 14 are contacted with each other to form the butt-jointing point 16 as shown in FIG. 1. It is to be noted that FIG. 4 and FIG. 5 are schematic views only illustrating that the wire fusing apparatus 100 cuts the wire 12. In this way, the cutting surfaces of the wires 12 and 14 match each other and are in complete contact with each other, thus increasing adhesion force between the wires 12 and 14 after fusing. In the present embodiment, as shown in FIG. 5, the second body 120 further includes a pivot end 120a for being pivoted to the first body 110, and a free end 120b opposite to the pivot end 120a. The cutting member 150 is disposed at the pivot end 120a. In this way, as shown in FIG. 5, when the second body 120 rotates along the rotation direction D1 for cutting the wires 12 and 14, since the cutting member 150 is disposed at the pivot end 120a far away from the free end 120b, a longer lever arm M1 is provided to enable the user to easily cut the wires 12 and 14 by lever principle.

Figure 6:
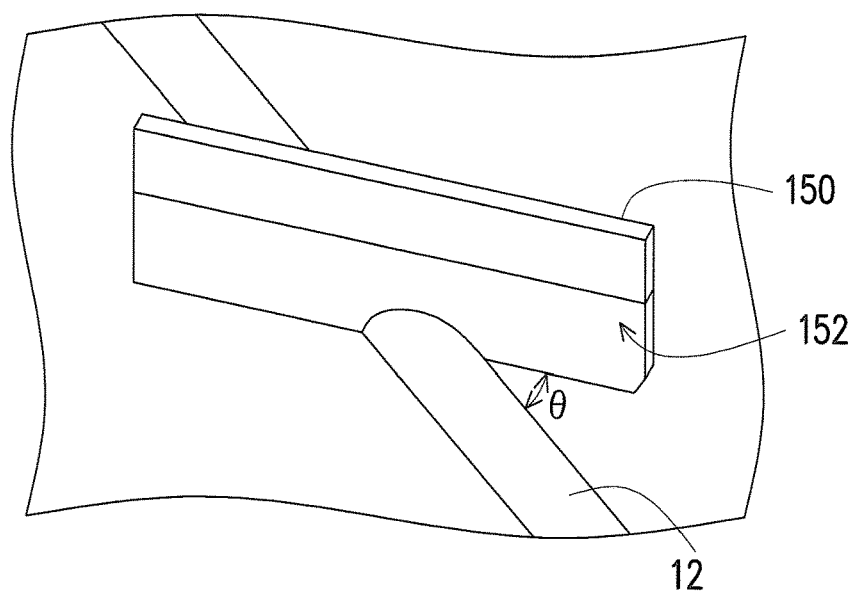
FIG. 6 is a schematic view of a cutting member in FIG. 4.
Figure 7:
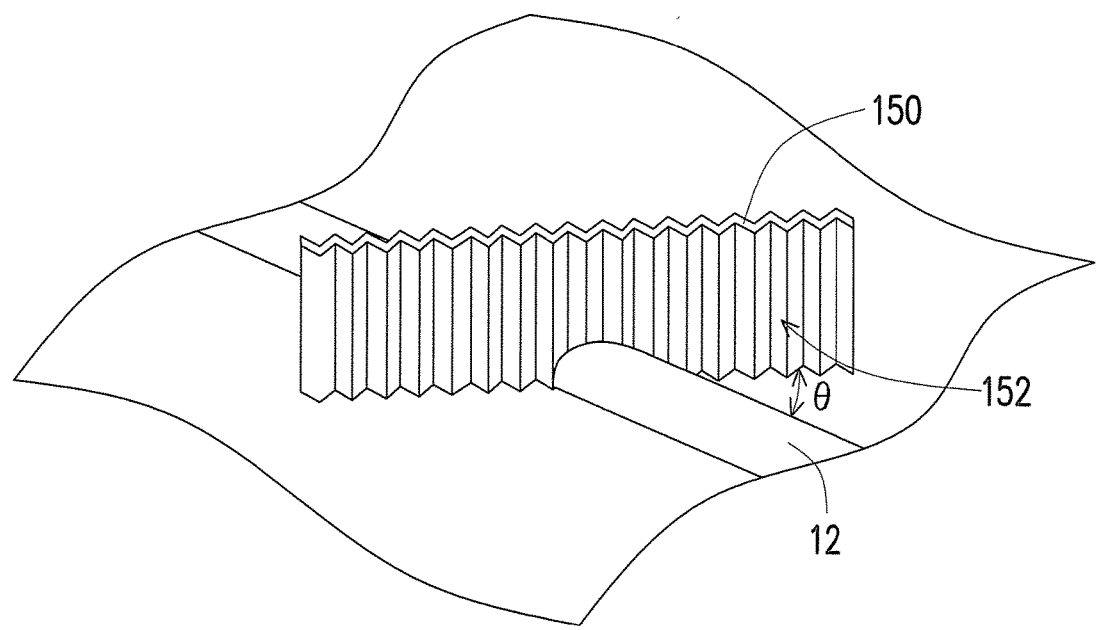
FIG. 7 is a schematic view of a cutting member according to another embodiment of the invention.

FIG. 6 is a schematic view of the cutting member in FIG. 4. FIG. 7 is a schematic view of a cutting member according to another embodiment of the invention. Referring to FIG. 4, FIG. 6 and FIG. 7 together, following the above, the cutting member 150 is a blade as shown in FIG. 6. A cutting side surface (i.e. one of two opposite side surfaces of the blade) 152 thereof is a planar surface. As shown in FIG. 6, a long axis of the cutting member 150 and a long axis of the containing groove 126 form an acute angle θ and are not perpendicular to each other. Accordingly, the cutting surfaces of the cut wires 12 and 14 are inclined planar surface, thus increasing a contact area between the wires 12 and 14 at the butt joint, and further increasing the adhesion force between the wires 12 and 14 after fusing. In addition, in the embodiment as shown in FIG. 7, the cutting side surface 152 of the cutting member 150 may be a non-planar surface. That is to say, the cutting side surface of the cutting member 150 is not a planar surface as shown in FIG. 6. More specifically, the cutting side surface of the cutting member 150 may be in wave shape or serrated shape as shown in FIG. 7. Accordingly, the cutting surfaces of the cut wires 12 and 14 are inclined surface in wave shape or serrated shape, thus increasing the adhesion force between the wires 12 and 14 after fusing.

Figure 8:
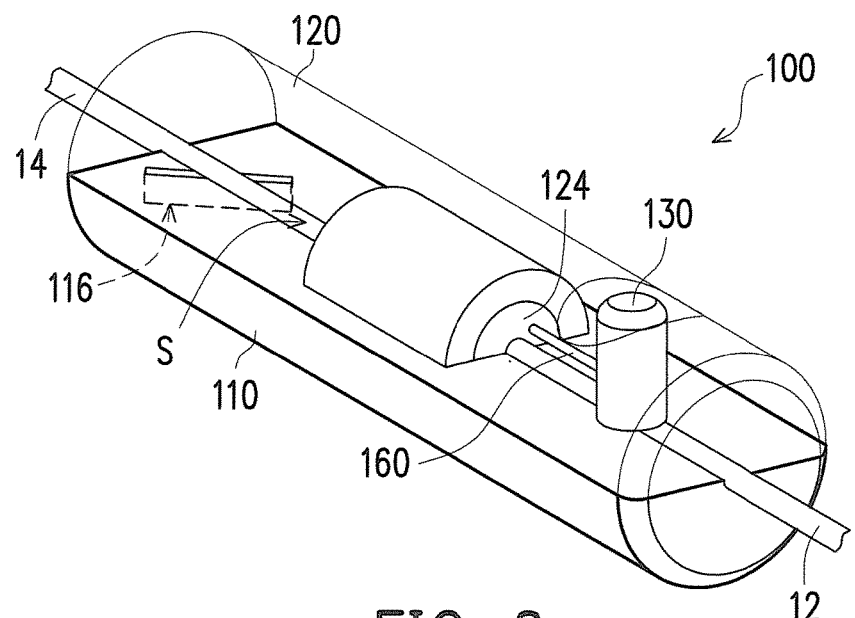
FIG. 8 is a schematic view of the wire fusing apparatus in FIG. 4 in a closed state.

FIG. 8 is a schematic view of the wire fusing apparatus in FIG. 4 in a closed state. Referring to both FIG. 4 and FIG. 8, in the present embodiment, the first body 110 further includes a recessed groove 116 disposed correspondingly to the cutting member 150. When the first body 110 and the second body 120 are in the closed state, the cutting member 150 is located in the recessed groove 116. In this way, when the second body 120 rotates along the rotation direction D1 as shown in FIG. 4, the cutting member 150 approaches the first body 110 along with the second body 120, so as to cut the wires 12 and 14. After cutting the wires 12 and 14, the cutting member 150 is located in the recessed groove 116 so that the first body 110 and the second body 120 can be in a completely closed state. In addition, the cutting member 150 in the present embodiment is detachably disposed on the second surface 122. In this way, after the wires 12 and 14 to be fused are cut by means of the cutting member 150, the cutting member 150 can be removed from the wire fusing apparatus 100. Then, the cutting surfaces of the cut wires 12 and 14 are disposed in a butt joint manner on the containing groove 126, followed by rotating the second body 120 toward the first body 110 to form the closed state as shown in FIG. 8. By heating the butt-jointing point 16 where the cutting surfaces of the cut wires 12 and 14 contact each other through the first heat-conducting region 114 and the second heat-conducting region 124, the wires 12 and 14 are fused to form, for example, the fused wire 10 as shown in FIG. 3.

In summary, the wire fusing apparatus of the invention includes the first body and the second body pivoted to each other at one side, so that the second body is adapted to rotate relatively to the first body to form the away state and the closed state, wherein the first body and the second body each includes a heat-conducting region adapted to be heated by the heating unit. In this way, the two wires to be fused are butt-jointed with each other and disposed in the containing groove of the first body. The second body is rotated relatively to the first body to be in the closed state with the first body. The butt-jointing point of the two wires is heated, so that the two wires are fused to form a fused wire.

The invention is applicable to fusing of a material supply wire of a three-dimensional printer, so as to fuse a material supply wire in use and a new material supply wire for replacement together. In this way, if it is found that a material supply wire is running out during a three-dimensional printing process, the wire fusing apparatus of the invention may be employed to fuse the material supply wire in use and the new material supply wire for replacement together to form a continuous material supply wire for subsequent use in the three-dimensional printer. Hence, there is no need to stop the printing process for replacement of the material supply wire or to start over the printing process after replacing the material supply wire. Of course, the invention is also applicable to any suitable occasion to perform a fusing process on any two wires needed to be fused. In addition, the wire fusing apparatus of the invention further includes a detachable cutting member configured to cut the wires to be fused before the fusing process is performed. Accordingly, contact surfaces of the two wires match and are in complete contact with each other, thus increasing the bonding force between the two wires after fusing.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:
1. A wire fusing apparatus, comprising:
   a first body, having a first surface;
   a second body, pivoted to one side of the first body to rotate relatively to the first body to be in an away state or a closed state with the first body, the second body having a second surface, wherein the first surface and the second surface each has a heat-conducting region, and when the first body and the second body are in the closed state, the first surface and the second surface are closed and jointly define a containing groove passing through the heat-conducting region of the first surface and the heat-conducting region of the second surface and for containing two wires butt-jointed with each other, wherein the heat-conducting region of the first surface and the heat-conducting region of the second surface contact each other when the first body and the second body are in the closed state;

a heating unit, disposed on the first body or the second body, and contacting one of the heat-conducting region of the first surface and the heat-conducting region of the second surface for heating a butt-jointing point of the two wires to foul' a fused wire by fusing the two wires; and a cutting member disposed on the second surface, wherein each of the two wires is adapted to be disposed on the first surface, and when the first body and the second body rotate from the away state to the closed state, the cutting member cuts each of the two wires to form a cutting surface on each of the two wires, wherein the cutting surfaces are adapted to contact each other to form the butt-jointing point.

2. The wire fusing apparatus according to claim 1, further comprising a heating control interface configured to be electrically connected to the heating unit so as to control the heating unit to switch on and off a heating process and to make a temperature adjustment on the heat-conducting region of the first surface and the heat-conducting region of the second surface.

3. The wire fusing apparatus according to claim 1, further comprising a first heat-insulating element disposed between the first surface and the heat-conducting region of the first surface, wherein the first heat-insulating element exposes a heat-conducting surface of the heat-conducting region of the first surface facing the second surface.

4. The wire fusing apparatus according to claim 1, further comprising a second heat-insulating element disposed between the second surface and the heat-conducting region of the second surface, wherein the second heat-insulating element exposes a heat-conducting surface of the heat-conducting region of the second surface facing the first surface.

5. The wire fusing apparatus according to claim 1, wherein the containing groove crosses over the second surface along a long axis of the second body.

6. The wire fusing apparatus according to claim 1, wherein a cutting side surface of the cutting member is a non-planar surface.

7. The wire fusing apparatus according to claim 1, wherein a cutting side surface of the cutting member is in wave shape or serrated shape.

8. The wire fusing apparatus according to claim 1, wherein the second body further comprises a pivot end and a free end opposite to the pivot end, and the cutting member is disposed at the pivot end.

9. The wire fusing apparatus according to claim 1, wherein the first body further comprises a recessed groove disposed correspondingly to the cutting member, and the recessed groove is adapted to contain the cutting member when the first body and the second body are in the closed state.

10. The wire fusing apparatus according to claim 1, wherein the cutting member is detachably disposed on the second surface.

* * * * *